United States Patent [19]

Roy

[11] 3,710,739
[45] Jan. 16, 1973

[54] METHOD AND APPARATUS FOR INCINERATION OF THERMOPLASTIC MATERIALS

[75] Inventor: Joseph Gerald Roy, South Charleston, W. Va.

[73] Assignee: Union Carbide Corporation

[22] Filed: Aug. 24, 1971

[21] Appl. No.: 174,324

[52] U.S. Cl. .............................. 110/18 R, 110/18 C
[51] Int. Cl. ............................................. F23g 7/00
[58] Field of Search ...110/8 R, 8 A, 8 C, 18 R, 18 C, 110/15

[56] References Cited

UNITED STATES PATENTS 3,344,758  10/1967  Watschke .............................. 110/18
3,490,395  1/1970  Boyd et al. ............................ 110/18
3,572,265  3/1972  Stockman ............................. 110/18

*Primary Examiner*—Kenneth W. Sprague
*Attorney*—Paul A. Rose, Aldo J. Cozzi, Gerald R. O'Brien, Jr. and Francis M. Fazio

[57] ABSTRACT

A method and apparatus for the self-supportive incineration of thermoplastic materials wherein the thermoplastic material serves as the fuel and wherein the heat from the incineration is utilized to melt the thermoplastic material to permit rapid gravity flow onto an essentially vertical heat conductive surface maintained at the vaporization temperature of the thermoplastic material. This method and apparatus provide a solution to the ecological problem of bulk waste disposal of thermoplastic materials.

33 Claims, 2 Drawing Figures

PATENTED JAN 16 1973 3,710,739

FEED ZONE

MELT ZONE

COMBUSTION ZONE

INVENTOR
JOSEPH G. ROY
BY
ATTORNEY

METHOD AND APPARATUS FOR INCINERATION OF THERMOPLASTIC MATERIALS

This invention relates to a method for incineration of thermoplastic material. Specifically this invention relates to a low cost self-supportive method for the incineration of thermoplastic materials wherein the thermoplastic material is the fuel.

This invention also relates to an apparatus for the incineration of thermoplastic material. Specifically this invention also relates to an apparatus designed to permit gravity flow of molten thermoplastic material onto a vertically disposed heat conductive surface maintained at about the vaporization temperature. More specifically this invention also relates to an apparatus designed for the self-supportive incineration of thermoplastic materials, utilizing the hot gases of combustion for melting thermoplastic material and rapidly flowing the molten material onto a vertically disposed surface maintained at about the vaporization temperature.

The use of thermoplastic materials in both industry and home is increasing at an extremely rapid pace. With this increase in use there is the attendant problem of waste disposal of discarded bulk thermoplastic materials. This problem is particularly acute in the consumer products field.

The most prevalent means for disposal of these waste thermoplastic materials is by bulk discard in oceans or as land fill. With the advent of the ecological realizations that bulk waste disposal is both costly and detrimental to the environment, new methods have been sought.

One such method is incineration. And one apparatus used heretofore is a batch feed gas burner. The gas burner was undesirable for primarily two reasons. Firstly, the gas was of course costly. And secondly, the batch method was ill-suited for large volume incineration.

To date no single continuous incineration method for thermoplastic materials has been found satisfactory. One reason for this lack of success has been that thermoplastic polymers have extremely low coefficients of thermal conductivity and are in fact considered good thermal insulators. This lack of good thermal conductivity causes extremely long residence times in a combustion chamber. Efforts to reduce the discrete particle size of the thermoplastic material in an attempt to increase the available combustion surface generally proved unsuccessful. This is because the low melting temperature of most thermoplastics in combination with thermoplastic fusion of the small discrete particles retarded efforts to reduce and maintain small discrete particles.

In an attempt to overcome the long residence period of combustion the prior art thought to first melt the thermoplastic material and then pump the molten mass to a combustion chamber. This pumping method was obviously costly and in many cases the pumping was technically unfeasible. This was so because pumping causes concomitant high shear forces on the molten mass and many thermoplastic polymers under heat and shear force react to form a highly viscous mass. For example molten polyethylene under high shear force will greatly increase in viscosity negating the possibility of continued pumping.

To overcome the aforementioned problems encountered in the prior art this invention for the first time provides a method for incineration of thermoplastic materials whereby the solid thermoplastic materials are fed to a heat conductive surface, having a plurality of orifices, maintained at a temperature above the melting point of the thermoplastic material and generally below the decomposition temperature, whereat the thermoplastic material is melted thereat and then permitted to flow by gravity through said orifices onto an essentially vertical heat conductive surface, maintained at about the vaporization temperature of the thermoplastic material, in the presence of oxygen and ignition means, so that the thermoplastic material vapors incinerate and wherein the hot gases of combustion transfer available sensible heat to the heat conductive surface permitting further melting and incineration.

With the solid thermoplastic material maintained on the melting surface, the solid thermoplastic material remains in place until melting occurs whereafter gravity flow of the molten material through an orifice onto the essentially vertical ignition surface occurs. It is within the contemplation of this invention that the size of the orifice be adjustable to permit regulated flow.

As stated, the molten material flows by gravity through an orifice onto an essentially vertical surface. By the term "essentially vertical" as used hereinbefore and hereinafter throughout the specification, it is meant to connote a surface that provides a rapid gravity flow of the molten material thereby causing a rapid increase in the surface area to weight ratio of the thermoplastic material. A large surface area to weight ratio of the thermoplastic material provides excellent heat transfer conditions insuring rapid ignition and complete combustion. Generally the ignition surface resides at an angle of from about 45° to about 90° with the horizontal. Angles of less than about 45° with the horizontal are useful although generally not preferred.

The system as above-described is self-supportive; the heat of combustion being sufficient to melt additional thermoplastic material. To start-up the system the heat conductive surfaces must first be heated by auxiliary ignition means and an initial flame introduced by said auxiliary means. A blow torch has proved successful. Once the system is preheated, the thermoplastic material first incinerated and melting in progress, the auxiliary ignition means is terminated. After start-up the incinerating thermoplastic material serves as its own ignition means.

To support the incineration, oxygen is supplied to the combustion chamber by any suitable gaseous supply means. The oxygen may be supplied neat or in admixture with other gases such as an inert gas for example nitrogen, argon and the like or as in ambient air. Preheated air may of course be employed, if desired.

It was found that the heat of combustion would support melting and incineration when the molten thermoplastic material would be caused to flow downward onto an essentially vertical heat conductive surface resulting in a large increase in the ratio of surface area to weight of the thermoplastic material permitting rapid heat transfer to the thermoplastic material so as to readily reach its vaporization temperature. The essentially vertical heat conductive surface is generally maintained at a temperature between the melting point of the thermoplastic material and at about the vaporization temperature, to vaporize the molten thermoplastic material.

In the present invention the hot gases of combustion are utilized to transfer heat to the conductive surface before said gases are expelled from the system. The primary means of heat transfer by the gases is of course convection. The incineration also permits heat transfer by radiation from the flame and additionally by secondary heat transfer between the heat conductive surfaces by means of conduction.

The essentially vertical ignition surface or surfaces may serve as baffling for the waste hot gases of combustion thereby permitting utilization of the available sensible heat in the waste gases for transfer to the ignition and melting surfaces. After baffling the hot gases are transferred out of the system through flue means. In the event combustion was less than complete, afterburning may be provided to ensure complete combustion.

Polyolefin combustion products are generally not detrimental to the environment and for this reason the method and apparatus of the present invention are best suited to polyolefins and other thermoplastics wherein the combustion products may readily be passed to the atmosphere. Suitable polyolefins include homopolymers of ethylene, propylene, 1-butylene and the like.

Those thermoplastic materials wherein the combustion products are generally considered harmful to the environment may require additional processing of the waste heat gases prior to explusion to the atmosphere. For example if large amounts of polyvinyl chloride are present the hot gases of combustion may contain undesired amounts of HCl and scrubbing may be required prior to passage of the gases into the atmosphere.

Broadly speaking the method and apparatus of this invention are suitable to any and all thermoplastic materials or mixtures thereof.

Thermoplastic materials of any size and shape may be accommodated employing this invention. Small discrete particles are of course preferred but larger particles may be used. The primary determining factor regarding the useful size of the thermoplastic material is the size and configuration of the apparatus.

Where very fine discrete particles are the feed material an adjustable orifice is normally required. This adjustable orifice would be closed during initial feed of the material until some melting occurs and then the orifice is gradually opened to permit flow of molten material only.

The oxygen feed and waste gas discharge may be conducted in concert on a continuous basis to provide continuous self-supportive system.

A preferred embodiment of this invention is depicted in FIGS. 1 and 2 and are briefly described hereinbelow.

Figure 1:
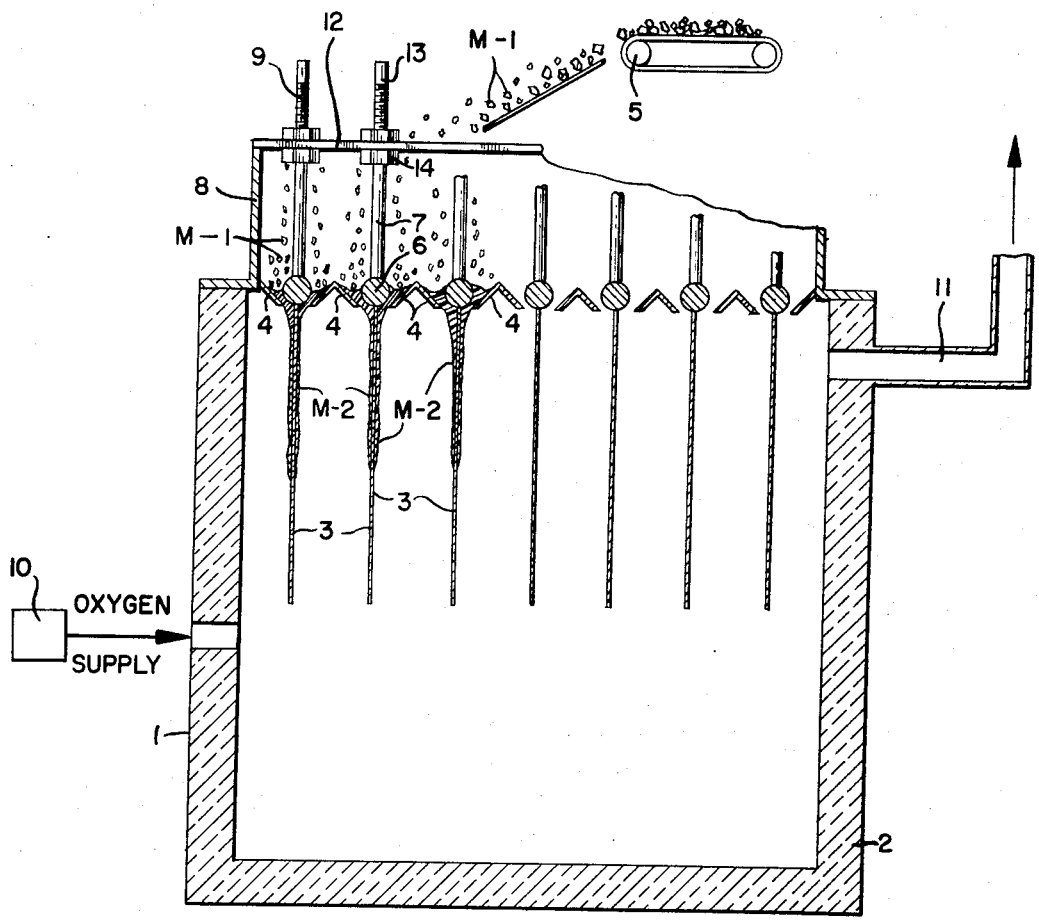
FIG. 1 is a sectional view of the apparatus of this invention in operation.
Figure 2:
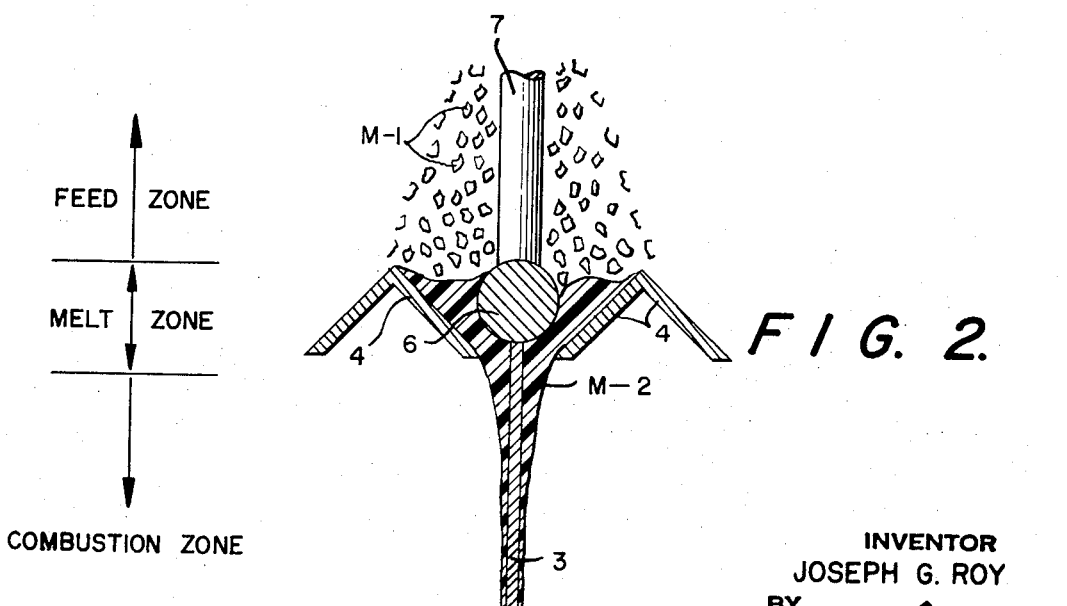
FIG. 2 is an enlarged fragmentary view of the orificed melting surface and ignition surface during operation.

Referring to the aforementioned FIGS. 1 and 2, the operation of the apparatus of this invention comprises three interrelated operating zones. Firstly, there is the feed zone wherein solid thermoplastic M-1 material is transferred to the feed hopper 8. The solid thermoplastic material resides on the top surface of the melting plate 4 and (in operation) on moltem thermoplastic material M-2. Secondly, there is the melt zone wherein solid thermoplastic material M-1 receives heat from orificed melting plate 4 and is thereby melted to form M-2 and whereafter the molten thermoplastic material M-2 flows by gravity onto the ignition plate 3. Thirdly, there is the combustion zone wherein the flowing molten thermoplastic material rapidly spreads on ignition plate 3 in the presence of oxygen supplied by supply means 10 and ignition means (not shown) so as to ignite and incinerate, whereinafter the incineration hot gases flow upward to the bottom surface of melting plate 4 and parallel to the ignition plate 3 before exiting the combustion chamber 1 through flue means 11.

Referring specifically to FIG. 1, the apparatus of this invention comprises material feed means 5 depicted as a conveyor. Any suitable solid handling system is operable including pneumatic, mechanical as well as manual systems. The apparatus also includes a feed hopper 8 into which said thermoplastic material M-1 is fed. The feed hopper 8 is mounted above the combustion chamber 1.

In the preferred embodiment depicted in FIG. 1 there is shown an adjustment support member 12 mounted to the feed hopper 8. The adjustment support member 12 as the nomenclature suggests supports a flow adjustment member 7 having flow regulating adjustment means 9 attached at the top thereof and a flow directing member 6 attached at the bottom thereof.

It is to be noted that in FIG. 1 the flow regulating adjustment means 9 is depicted as a screw 13 and lock nut 14 assembly, however any controlling means for moving the adjustment member 7 in a vertical mode is suitable. The vertical motion of the adjustment member 7 results in a variation in the orifice represented as the space between the flow directing member 6 and the orificed melting plate 4.

This variable orifice permits control of the flow rate of the molten thermoplastic material M-2 from feed zone through the melt zone onto the combustion zone as depicted in FIG. 2. It is most preferred that the apparatus have a variable orifice for controlled flow of molten thermoplastic material M-2. Apparati of fixed orifice are suitable but as stated are not preferred.

The apparatus further comprises an orificed melting plate 4 or a plurality of said melting plates wherein the melting plated is mounted in concert with the feed hopper 8 and the combustion chamber 1. The orificed melting plate 4 is of any heat conductive material preferably a metal and serves to transfer the heat involved in the combustion chamber 1 to the solid thermoplastic material M-1 to melt same.

The apparatus of this invention further comprises an ignition plate 3 having an essentially vertical heat conductive surface or a plurality of same. As shown in FIG. 2 the ignition plate 3 is mounted to the flow directing member 6. This mounting arrangement is advantageous in that heat from the ignition plate 3 is conductive to the flow directing member 6 to ensure molten material at the surface of the flow directing member 6 thereby providing a free flowing system more responsive to control.

The ignition plate 3 is housed in combustion chamber 1 wherein said chamber has suitable insulation 2 to minimize the heat losses.

The ignition plate 3 may be of any suitable material that is heat conductive, preferably a metal.

Mounted in concert with the combustion chamber is oxygen supply means 10 of either a compressed cylinder supply, an induction fan or any suitable gaseous supply source. Regulatory valve and safety valve means many of course be added to the oxygen supply means 10 as desired. The oxygen may be supplied neat or in mixture with an inert gas such as nitrogen, argon and the like or in ambient air. The supply gas may of course be preheated.

Also mounted in concert with the combustion chamber is flue means 11 whereby the waste gas from the combustion of the molten thermoplastic material M-2 passes across the ignition plate 3 and the bottom surface of the orificed melting plate 4 transferring heat thereto and thereafter exiting the combustion chamber 1 by flue means 11.

As depicted in FIG. 1 the ignition plate 3 specifically the major surfaces thereof are shown at a right angle to the direction of the oxygen supply 10 flow direction. This need not be so and the major surfaces of the ignition plate 3 may be and are preferably parallel to the oxygen supply 10 flow direction.

A parallel arrangement of the oxygen supply 10 flow direction, the ignition plates 3 and the flue means 11 permits the oxygen to fill a maximum volume of the combustion chamber and is a preferred arrangement.

In the event the waste gas contains undesired gaseous products, scrubbing or collecting means may be provided in connection with the flue means 11.

In the event the waste gas contains incomplete combustion products, an afterburner and gas recycle system may be further provided in connection with the flue means 11.

Those skilled in the art will appreciate that there has been illustrated and described a highly versatile method and apparatus for the incineration of thermoplastic materials. Moreover it will be understood that the apparatus may be adapted for a wide range of thermoplastic materials and for a wide range of material incineration rates. Also it will be readily understood that the arrangement of the several components may be altered to meet the specific design requirements of any thermoplastic incineration system without deviation from the scope or intent of the invention described herein.

What is claimed is:

1. A method for the incineration of solid thermoplastic material which comprises melting said solid thermoplastic material on a heat conductive surface having a plurality of orifices and flowing said molten thermoplastic material through said orifices onto an essentially vertical heat conductive surface, maintained at about the vaporization temperature of the thermoplastic material, in the presence of oxygen and ignition means so that the thermoplastic material is incinerated.

2. A method for the incineration of solid thermoplastic material which comprises:
   a. melting said solid thermoplastic material on a heat conductive surface having a plurality of orifices;
   b. flowing said molten thermoplastic material through said orifices onto an essentially vertical heat conductive surface maintained at about the vaporization temperature of the thermoplastic material to vaporize the molten material, in the presence of oxygen and ignition means to incinerate the vapors to hot gases and;
   c. transferring heat from the hot gases of process step (b) to the heat conductive surface of process step (a);

so that the transferred heat melts additional thermoplastic material so as to permit flow and subsequent incineration thereof.

3. The method of claim 2 wherein the melting occurs at a temperature above the melting point and below the decomposition temperature of the thermoplastic material.

4. The method of claim 2 wherein the flowing is under a low shear force.

5. The method of claim 2 wherein the flowing is by gravity.

6. The method of claim 2 wherein the heat conductive surface of step (b) resides at an angle of from about 45° to about 90° with the horizontal.

7. The method of claim 2 wherein the heat conductive surface of step (b) resides at an angle of less than about 45° with the horizontal.

8. The method of claim 2 wherein the oxygen is present as a component in air.

9. The method of claim 2 wherein the oxygen is present in mixture with an inert gas.

10. The method of claim 2 wherein the heat transfer is by convection.

11. The method of claim 2 wherein the heat transfer is by conduction.

12. The method of claim 2 wherein the heat transfer is by radiation.

13. The method of claim 2 wherein the heat transfer is by a combination of convection, conduction and radiation.

14. The method of claim 2 wherein the thermoplastic material is a polyolefin.

15. The method of claim 2 wherein the thermoplastic material is polyethylene.

16. A method for the self-supportive incineration of solid thermoplastic material which comprises in combination the steps of:
   a. supplying solid thermoplastic material;
   b. melting said solid thermoplastic material on a heat conductive surface having a plurality of orifices;
   c. flowing said molten thermoplastic material through said orifices onto an essentially vertical heat conductive surface maintained at about the vaporization temperature of the thermoplastic material to vaporize the molten material, in the presence of ignition means;
   d. continuously passing an oxygen containing gas across said surface of step (c) to incinerate said vapors to hot gases;
   e. passing the hot gases of incineration across the bottom surface of the heat conductive surface of (b) to transfer heat thereto; and
   f. continuously discharging the hot gases of step (e); whereby the transferred heat causes further melting and flowing of the thermoplastic material for incineration thereof.

17. The method of claim 16 wherein the melting occurs at a temperature above the melting point and below the decomposition temperature of the thermoplastic material.

18. The method of claim 16 wherein the flowing is under a low shear force.

19. The method of claim 16 wherein the flowing is by gravity.

20. The method of claim 16 wherein the surface of step (c) resides at an angle of from about 45° to about 90° with the horizontal.

21. The method of claim 16 wherein the oxygen is present as a component in air.

22. The method of claim 16 wherein the oxygen is present in mixture with an inert gas.

23. The method of claim 16 wherein the heat transfer is by convection.

24. The method of claim 16 wherein the heat transfer is by conduction.

25. The method of claim 16 wherein the heat transfer is by radiation.

26. The method of claim 16 wherein the heat transfer is by a combination of convection, conduction and radiation.

27. The method of claim 16 wherein the thermoplastic material is a polyolefin.

28. The method of claim 16 wherein the thermoplastic material is polyethylene.

29. An apparatus for the incineration of thermoplastic material which comprises:
   a. an insulated combustion chamber;
   b. essentially vertical heat conductive plate housed within the insulated combustion chamber;
   c. heat conductive plate having a plurality of orifices housed above the insulated combustion chamber and the essentially vertical heat conductive plate;
   d. solid thermoplastic material supply means;
   e. oxygen supply means;
   f. hot gas flue means; and
   g. ignition means;

whereby solid thermoplastic material supply means supplies thermoplastic material to the top surface of the heat conductive plate (c) at a temperature above the melting point of the thermoplastic material whereat the thermoplastic material is melted and allowed to gravity flow through the orifices onto the surface of the essentially vertical heat conductive plate at a temperature about the vaporization temperature of the molten material in the presence of ignition means and oxygen from the oxygen supply means so as to be incinerated, whereafter the hot gas of incineration passes across the bottom surface of the heat conductive plate (c) thereby transferring heat thereto so as to cause further melting, flowing, vaporization and incineration of the thermoplastic material as aforesaid.

30. The apparatus of claim 29 wherein the apparatus further comprises an adjustable flow regulating member mounted to regulate the orifice size thereby regulating the flow rate of molten thermoplastic material.

31. The apparatus of claim 29 wherein the essentially vertical heat conductive plate is at an angle of from about 45° to about 90° with the horizontal.

32. The apparatus of claim 29 wherein the solid thermoplastic supply means is a conveyor.

33. The apparatus of claim 29 wherein the oxygen means is an air induction fan.

* * * * *